(12) United States Patent
Boedot

(10) Patent No.: US 10,393,158 B2
(45) Date of Patent: Aug. 27, 2019

(54) DEVICE FOR FIXING TWO PARTS TOGETHER

(71) Applicant: SNECMA, Paris (FR)

(72) Inventor: Bertrand Boedot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 855 days.

(21) Appl. No.: 14/896,884

(22) PCT Filed: Jun. 11, 2014

(86) PCT No.: PCT/FR2014/051418
§ 371 (c)(1),
(2) Date: Dec. 8, 2015

(87) PCT Pub. No.: WO2014/199081
PCT Pub. Date: Dec. 18, 2014

(65) Prior Publication Data
US 2016/0153482 A1    Jun. 2, 2016

(30) Foreign Application Priority Data
Jun. 11, 2013 (FR) ...................................... 13 55399

(51) Int. Cl.
*F16B 5/02* (2006.01)
*F16B 37/12* (2006.01)
*F16B 41/00* (2006.01)

(52) U.S. Cl.
CPC .......... *F16B 5/0208* (2013.01); *F16B 37/122* (2013.01); *F16B 41/002* (2013.01)

(58) Field of Classification Search
CPC .... F16B 37/122; F16B 41/002; F16B 5/0208; F16B 5/0275; F16B 5/0283; F16B 37/125
See application file for complete search history.

(56) References Cited

U.S. PATENT DOCUMENTS 1,755,590 A     4/1930  Carr
2,304,107 A  * 12/1942  Leisure ................. F16B 37/044
                                                        411/111
(Continued)

FOREIGN PATENT DOCUMENTS

DE    4344863 A1 *  7/1995  ............ F16B 5/0291
DE    4344863 C2 * 10/1995  ............ F16B 5/0291
(Continued)

OTHER PUBLICATIONS

Search Report dated Feb. 19, 2018, issued in corresponding Russian Application No. 2015154969, filed Jan. 11, 2016, 2 pages.
(Continued)

*Primary Examiner* — Matthieu F Setliff
(74) *Attorney, Agent, or Firm* — Christensen O'Connor Johnson Kindness PLLC

(57) ABSTRACT

The disclosure relates to a fixing device for fixing a first part and a second part together. The fixing device may include a nut non-rigidly coupled to the first part. The first part may have a fixing flange with at least one orifice positioned to accept a threaded shank coupled to the second part. A retainer may be proximate an inner diameter of the at least one orifice positioned to retain the nut within the fixing flange before the nut is screwed onto the threaded shank. The nut may have an externally threaded portion which may couple to the internally threaded portion of the orifice in the flange or of an element attached to the flange and to pass completely through the internally threaded portion until it is housed in a cavity for axially retaining the nut. Therefore, the nut may rotate freely before it is fastened to the threaded shank. The disclosure also relates to a turbomachine that utilizes this device and to an associated fixing method.

16 Claims, 2 Drawing Sheets

(56) References Cited

U.S. PATENT DOCUMENTS

| | | | | |
|---|---|---|---|---|
| 2,639,179 | A * | 5/1953 | Phelps | A61G 17/02 292/251 |
| 2,761,484 | A * | 9/1956 | Sternick | F16B 41/002 411/107 |
| 2,922,456 | A * | 1/1960 | Kann | F16B 41/002 411/353 |
| 3,018,127 | A | 1/1962 | Dobrosielski | |
| 3,602,976 | A * | 9/1971 | Grube | F16B 31/021 29/407.03 |
| 3,728,933 | A * | 4/1973 | Grube | F16B 31/02 29/446 |
| 3,841,177 | A * | 10/1974 | Watterback | F16B 31/02 411/1 |
| 4,427,326 | A * | 1/1984 | Hobson | F16B 41/005 411/5 |
| 4,439,078 | A * | 3/1984 | Dessouroux | F16B 37/125 29/426.5 |
| 4,655,660 | A * | 4/1987 | McGlone | F16B 37/122 411/366.2 |
| 4,971,493 | A * | 11/1990 | Herbst | E02D 5/808 405/259.1 |
| 4,981,735 | A * | 1/1991 | Rickson | F16B 5/01 156/92 |
| 5,066,180 | A * | 11/1991 | Lang | F16B 37/044 411/103 |
| 5,175,665 | A * | 12/1992 | Pegg | B64D 45/02 244/1 A |
| 5,314,144 | A * | 5/1994 | Porter, Jr. | F16B 5/0208 244/119 |
| 6,024,523 | A * | 2/2000 | Oudmayer | F16B 37/122 411/111 |
| 6,296,431 | B1 * | 10/2001 | Miller | F16B 5/0208 411/107 |
| 6,461,093 | B1 * | 10/2002 | Junkers | F16B 31/04 411/432 |
| 6,779,957 | B2 * | 8/2004 | Ozawa | B62D 25/147 411/311 |
| 6,789,993 | B2 * | 9/2004 | Ozawa | F16B 5/0233 411/432 |
| 6,860,693 | B2 * | 3/2005 | Jones | F16B 5/0208 29/525.11 |
| 6,905,298 | B1 * | 6/2005 | Haring | F16B 5/025 411/178 |
| 7,488,135 | B2 * | 2/2009 | Hasegawa | F16B 5/0233 403/167 |
| 8,267,630 | B2 * | 9/2012 | Moon | F16B 5/02 411/110 |
| 8,474,766 | B2 * | 7/2013 | Liu | F16B 5/0233 248/188.4 |
| 8,770,902 | B1 * | 7/2014 | Miller | F16B 5/0208 29/451 |
| 8,854,829 | B1 * | 10/2014 | Bopp | H05K 7/142 174/382 |
| 9,822,808 | B2 * | 11/2017 | Rajeev | F16B 37/044 |
| 2002/0150445 | A1 * | 10/2002 | Ozawa | F16B 5/0233 411/546 |
| 2002/0197130 | A1 * | 12/2002 | Ozawa | B62D 25/147 411/353 |
| 2004/0161317 | A1 * | 8/2004 | Jones | F16B 5/0208 411/433 |
| 2007/0297869 | A1 * | 12/2007 | Kunda | F16B 5/025 411/108 |
| 2010/0024435 | A1 | 2/2010 | Vauchel | |
| 2011/0008125 | A1 * | 1/2011 | Moon | F16B 5/02 411/108 |
| 2012/0317789 | A1 * | 12/2012 | Moon | F16B 5/02 29/525.11 |
| 2017/0023050 | A1 * | 1/2017 | Garbuglia | F01D 25/246 |

FOREIGN PATENT DOCUMENTS

| | | | |
|---|---|---|---|
| EP | 0972955 A2 | 1/2000 | |
| FR | 2 909 974 A1 | 6/2008 | |
| GB | 1045122 A | 10/1966 | |
| RU | 2203440 C2 | 4/2003 | |
| WO | 2009/048356 A1 | 4/2009 | |
| WO | WO-2010085902 A1 * | 8/2010 | F16B 5/0233 |

OTHER PUBLICATIONS

International Search Report dated Oct. 2, 2014, issued in corresponding International Application No. PCT/FR2014/051418, filed Jun. 11, 2014, 3 pages.

Written Opinion of the International Searching Authority dated Oct. 2, 2014, issued in corresponding International Application No. PCT/FR2014/051418, filed Jun. 11, 2014, 8 pages.

International Preliminary Report on Patentability dated Dec. 15, 2015, issued in corresponding International Application No. PCT/FR2014/051418, filed Jun. 11, 2014, 1 page.

* cited by examiner

DEVICE FOR FIXING TWO PARTS TOGETHER

TECHNICAL FIELD

The invention relates to a device for fixing two parts together. It relates more particularly to the nuts used for fixing equipment to the structure of a turbine engine or any other mechanical application requiring a bolted assembly, and manipulation thereof during maintenance operations.

DISCLOSURE OF THE PRIOR ART

Pieces of equipment such as sensors are fixed in the nacelle of a turbine engine. For example, in order to fix a probe taking the form of a cylinder that has to pass through the wall, it is equipped with a flange and the flange is positioned by inserting the orifices in the flange around studs provided for this purpose on the wall. Flat nuts are then screwed onto these studs.

This solution is associated with risks during maintenance. This is because it turns out that the place where the equipment is positioned has reduced accessibility. This increases the danger of allowing a nut that is not engaged on the stud to escape during incorrect handling. This may have serious consequences since it is sometimes impossible to search for said nut at the bottom of the nacelle.

One solution is known comprising captive or trapped nuts (FR 06 10850) but in this case the rotation thereof is blocked and it is the bolts that are turned. This solution is not applicable in the aforementioned case since the studs are fixed to the internal surface of the nacelle. It is therefore necessary to be able to turn the nuts.

At least one other possibility is known that consists in trapping the nut in a cowl welded to the flange. In this case the nut comprises a wide base that bears on the flange when the nut is tightened on the stud and a projecting cylindrical part to which a tightening tool can be applied. The cowl comprises a hole from which the cylindrical part of the nut adapted to the tightening tool emerges. This solution is acceptable in that it makes it possible to tighten the nut while being assured that it will not be lost when it is unscrewed from the stud. On the other hand, if the nut is damaged, it is impossible to replace it easily without undoing or even destroying the trapping system.

The invention proposes a solution that is simple to implement during maintenance in order to have a captive nut that is free to rotate and that can be tightened using a conventional tool and can easily be replaced in the event of damage.

PRESENTATION OF THE INVENTION

For this purpose, the invention relates to a device for fixing two parts together, a first part comprising a fixing flange comprising at least one orifice for a threaded rod to pass through, supported by or rigidly connected to a second part, and means for making the nut captive with respect to the flange before it is screwed onto the threaded rod, characterised in that said means are of the type having a thread, the nut comprising a portion having an external thread intended to be screwed into an internally tapped portion of the orifice in the flange or an element attached to the flange, and to pass completely through this internally tapped portion until it is received in a cavity for axially retaining the nut, which allows free rotation of the nut before it is screwed onto the threaded rod.

According to the invention, since the internal tapping corresponds to the fact of having formed a thread, for example by means of a screw tap, inside the portion of the orifice or the element, the nut is made captive on the flange by screwing said nut into the orifice in the flange or in the element supported by the flange, until the externally threaded portion of the nut is disengaged from the internally tapped portion. The threaded portion of the nut is then received and retained in the cavity, which allows free rotation of the nut so that said nut can be screwed onto the threaded rod.

Advantageously, the cavity is delimited at one axial end by an axial end of the internally tapped portion and at its opposite end by the second part or a portion of the flange or of the element attached to the flange.

Thus the nut can cooperate firstly with the flange or the attached element in order to ensure that it is axially held with respect to the flange, and secondly with the threaded portion of the flange or of the attached element in order to ensure it is axially held in the other direction. The fact that the second part may limit the cavity that allows free rotation makes it possible to tighten the nut on the threaded rod when the flange is in position on the second part without there being any interaction between this second part and the nut which disrupts the tightening of the nut on the threaded rod.

Advantageously, the orifice or the element attached to the flange comprises a first internally tapped portion and a second non-threaded portion, the inside diameter of which is greater than that of the first portion.

When the thickness of the flange so permits, this device can thus be easily produced by making a thread in a part of the orifice, having a cross section adapted to the external thread on the movable nut, and by widening the rest of the orifice. In a variant, an annular support fixed to the flange may serve as a cage for trapping the nut, this support comprising an internal tapping at the end thereof opposite to the flange.

In a first embodiment, the nut comprises means for bearing on the flange that are axially separated from the externally threaded portion by an intermediate part, the outside diameter of which is less than that of the outside diameter of this externally threaded portion.

This may correspond to adding a cylindrical portion to a standard nut and making an external thread at a suitable distance over this portion. This nut is adapted to the case where the internally tapped portion of the orifice is made in the thickness of the flange.

Advantageously, the intermediate portion of the nut has an axial dimension greater than that of the internally tapped portion on the flange. This allows the externally threaded portion of the nut to turn without friction in the cavity.

Advantageously, the bearing means comprise an external annular collar, at least one external peripheral portion of which has a polygonal shape in cross section intended to cooperate with a tool for screwing the nut.

Preferably, the bearing means have a diameter greater than that of the non-threaded second portion.

Advantageously, the nut may comprise a first internal hollow portion capable of allowing the threaded rod to pass through while allowing free rotation of the nut about said threaded rod before screwing said rod into a second internally threaded hollow portion of the nut.

This makes it possible to engage the stud in the nut before proceeding with tightening, and therefore to position the flange before tightening by centring the nuts on the studs.

Preferably, the axial distance on the nut between said second internally threaded hollow portion and the externally threaded portion is greater than the length of the intermediate part.

Even more preferably, the sum of the height of the cavity in the orifice in the flange and the axial distance on the nut, between said second internally threaded hollow portion and the externally threaded portion, is greater than the length of the threaded rod of the stud above the surface of the support.

This arrangement makes it possible to unscrew the nut from the stud without engaging said nut in the threaded portion of the orifice in the flange, while keeping the flange pressed against the support. In this way, it is possible to unscrew the nuts from the flange without risking losing said nuts since they will have been able to emerge from the flange at the time of unscrewing.

The invention also relates to a nut for such a device, comprising a first axial end comprising an externally threaded portion, a second axial end configured so as to cooperate with a tool for screwing the nut and comprising an outer transverse bearing surface turned towards the first axial end, an axial cavity emerging on one side on the first axial end and on the other side on an internally tapped axial portion, the cross section of said cavity being greater than that of said portion, characterised in that the internally threaded portion is separated from the internally tapped portion by a distance greater than the distance that separates it from the transverse bearing surface.

The invention also relates to aeronautical equipment, in particular a turbine engine, comprising at least two parts connected by at least one such device. Preferably it is a turbine engine such as a turbojet engine or a turboprop engine of an aircraft comprising a nacelle, the first part being an item of equipment such as a sensor and the second part being a part of the nacelle of the turbine engine.

The invention also relates to a method for fixing two parts in a machine by means of such a device, characterised in that it comprises the steps consisting of:
  screwing the externally threaded portion of the nut into the internally tapped portion until said externally threaded portion is engaged and held axially in the cavity,
  positioning the first part on the second part so that the nut is aligned on the axis of the threaded rod and is ready to be screwed thereon, and
  screwing the nut onto the threaded rod by means of a screwing tool, until the nut bears on the flange.

DESCRIPTION OF AN EMBODIMENT OF THE INVENTION

The invention will be better understood and the advantages and features thereof will emerge more clearly in the examples described in more detail below with reference to the accompanying drawings, in which.

Figure 1:
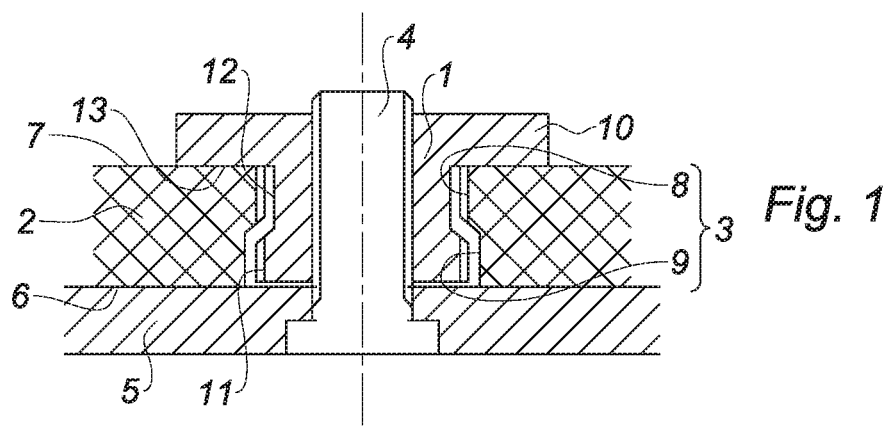
FIG. 1 is a radial section of a first embodiment of the nut and the flange according to the invention, the nut being in the mounted position on the flange and tightened on the stud.
Figure 2:
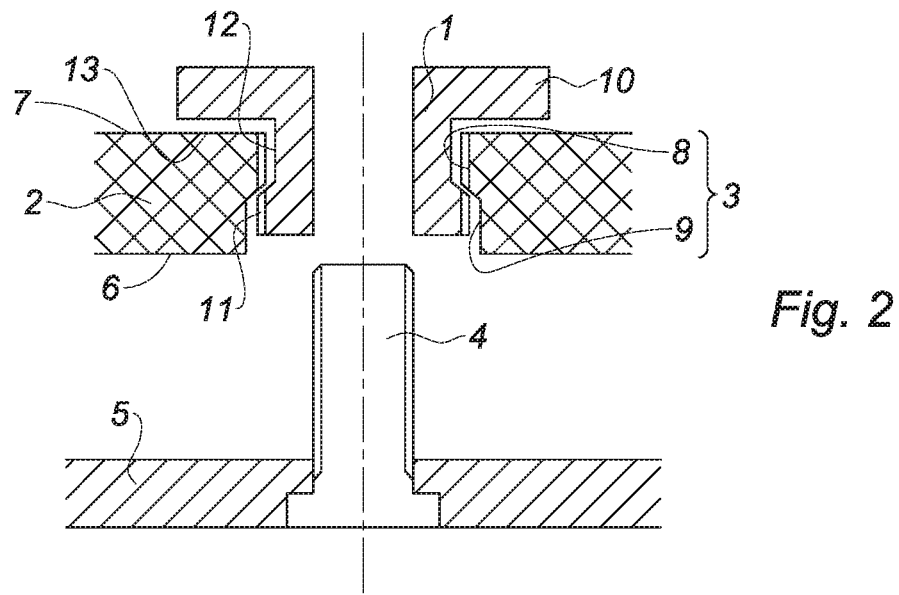
FIG. 2 is another radial section of the first embodiment of the nut and the flange according to the invention, the nut being in the free position on the flange and unscrewed from the stud.

In a first embodiment depicted in FIGS. 1 and 2, the nut 1 according to the invention is associated with a flange 2 formed so as to adapt to the surface on which it is to be fixed, and pierced with orifices 3 centred on the position of threaded rods 4 (studs) integrated in the support 5. The studs 4 have a cylindrical shape having a circular cross section and have an external thread so as to cooperate with the nut 1.

Around the orifice 3, the thickness of the flange 2 is less than the height of the stud 4 projecting out of the surface of the support 5. The internal surface 6 of the flange 2, turned towards the surface of the support 5, matches said surface, and its external surface 7, on the opposite side, is flat so as to form a shoulder on which the nut 1 comes to bear.

The orifice 3 comprises two cylindrical portions 8 and 9 having circular cross sections and diameters greater than that of the stud that is to pass through them. The portion 8 situated on the same side as the external face 7 has an internal tapping.

In the present document, the concept of threading or tapping refers to one or more threads of material winding helically over a cylindrical surface, inner or outer, making a given number of turns. Since the height of the of the threads of this threading or tapping are important for the invention, it will be stated in the remainder of the document, when necessary, whether the diameter of a threaded or tapped portion is measured at the edge of the threading or tapping, on the free end of the threads of materials, or in the hollow of the threads of the threading or tapping.

The internally tapped portion 8 has a diameter, at the hollow of the threads, which is at most equal to that of the wide portion 9, situated on the same side as the face of the flange that is to be applied to the support 5. Preferably, the length of the internally tapped portion 8 is less than half of the thickness of the flange 2 but is sufficient for the inner threads to extend over at least one turn.

The movable nut 1 adapted to the flange 2 and the stud 4 is in the form of a hollow cylinder having a flat head 10 at one of its ends and a portion having an external thread 11 at the other end. The axis of this cylinder is the axis of the nut 1.

The internal cavity of this hollow cylinder has a circular cross section of a diameter equal to that of the stud 4, and its surface has a tapping adapted to that of the stud 3 in order to be able to screw the nut 1 thereon. The external surface of the intermediate cylindrical portion 12 lying between the head 10 and the externally threaded portion 11 has a circular cross section having a diameter of less than that of the cross section of the top portion 8 of the orifice 3 of the flange 1 at the edge of the threads of its tapping.

The head 10 of the nut 1 is formed so as to receive a tightening tool. It has for example a polygonal contour corresponding to current standards for standard maintenance tooling such as a flat spanner. Alternatively, it is a pattern on the transverse end of the head 10 that makes it possible to adapt it to other types of tool. In addition, the transverse face 13 of the head 10 of the nut 1, turned towards the intermediate portion 12, is flat and has a diameter greater than that of the two portions 8 and 9 of the orifice in the flange 2. This diameter is sufficient for this surface 13 of the head 10 to provide firm bearing against the external face 7 of the flange 2 when the nut 1 is tightened on the stud 4.

The externally threaded portion 11, situated at the end of the nut 1 opposite to the head 10, has a diameter, at the hollow of its threading, equal to that of the internally threaded portion 8 of the orifice 3 at the edge of the threads of its tapping, and the two threadings are suitable for being able to screw the nut 1 in the internally tapped portion 8 of the orifice 3. This externally threaded end 11 therefore corresponds to a rim with respect to the intermediate cylindrical portion 12 of the nut 1. In practice, this protrusion corresponds to the clearance necessary for fitting the flange 2 on all the studs 4 but remains limited in order to maintain the centring of this flange 2 on a given position. In a variant, the diameter of the threaded portion 11 at the hollow of its threading, that of the intermediate cylindrical portion 12 of the nut 1, and that of the internally tapped portion 8 of the orifice 3, at the edge of the threads of its tapping, are adjusted. It is then the threads of the threadings and tappings, by virtue of their height with respect to the surfaces of the nut 1 and orifice 3, that produce the interface making it possible to block the translation of the nut 1 towards the outside of the flange 2.

So that the externally threaded portion 11 of the nut 1 can be released from the internally tapped portion 8 of the orifice 3 during screwing thereof, the intermediate cylindrical portion 12 on the nut 1 has a length greater than the distance, in the orifice 3 of the flange 2, between the external face 7 of the flange 2 and the opposite edge of the internally tapped portion 8. Preferably, the externally threaded portion 11 of the nut 1 has a length, along the axis of the nut 1, of less than the axial dimension of the non-threaded portion 9 of the orifice 3 of the flange 2. In addition, the sum of the lengths of this externally threaded portion 11 and of the intermediate cylindrical portion 12 of the nut 1 is advantageously less than the thickness of the flange 2 at the orifice 3. Also preferably, the length of the externally threaded portion 11 on the nut 1 is less than that of the internally tapped portion 8 of the orifice 3.

This configuration of the nut 1 and the flange 2 makes it possible to implement three situations of interest for the maintenance operations.

The first situation corresponds to the mounted position, where the nut 1 has been screwed onto the stud 4 until tight. As can be seen in FIG. 1, in this position the transverse bearing surface 13 of the head 10 of the nut 1 bears on the external surface 7 of the flange 2, said surface of the flange bearing on the surface of the support 5. The non-threaded portion 9 of the orifice 3 of the flange 2 forms a cavity delimited at one of its axial ends by the internally tapped portion 8 and at the other end by the surface of the support 5. Given the lengths of the intermediate cylindrical portion 12 and of the externally threaded portion 11 of the nut 1, the end of the nut 1 opposite to the head 10 does not bear on the surface of the support 5 and therefore does not disrupt the tightening function exerted by the bearing face 13 of the head 10 of the nut 1 bearing on the flange 2. It must also be noted that, in this position, there is no interaction between the externally threaded portion 11 of the nut 1 and the internally tapped portion 8 of the orifice 3. It is therefore possible to freely turn the nut 1 in the cavity formed by the non-threaded portion 9 of the orifice 3 in order to screw it and unscrew it on the stud 4 freely with respect to these interfaces.

In a variant, the externally threaded portion 11 of the nut is not situated completely at the opposite end to the head 10 of the nut 1. On the contrary, it is close to it and the overall distance from the end of the nut 1 to the face 13 of the head 10 bearing on the flange 12 remains less than the thickness of the flange 2.

Moreover, since the nut 1 is perfectly centred on the stud 4, any errors in centring of the flange 2, when the nuts are tightened, are limited by the smallest of the differences in diameter between the nut 1 and the orifice 3. In the embodiment, which is non-limitative, it is the internally tapped portion 8 of the orifice 3 and the intermediate cylindrical portion 10 of the nut 1 that are situated facing each other over the greatest distance. It is therefore the difference between the diameters of these two elements that it is important to minimise.

In the second situation, in the free position, the flange is manipulated in front of its support 5, either before mounting or after removal, when the nut 1 has been completely unscrewed from the stud 4.

As can be seen in FIG. 2, in this position the nut 1 released from the stud 4 is free to rotate in the orifice 3 of the flange 2. On the other hand, the part of the nut 1 situated in the orifice 3 prevents it from sliding laterally against the flange 2, the head 10 retains the nut 1 axially in one direction and its external threaded end 11 retains it in the other direction, bearing against the internally tapped portion 8 of the orifice 3 of the flange 2.

The third situation corresponds to the separated position, where the nut 1 has been removed from the flange 2, for example in order to replace it.

It is possible to move between the free position and the separated position by screwing and unscrewing the externally threaded portion 11 of the nut 1 through the internally tapped portion 8 of the orifice 3 in the flange 2. The internally tapped portion 8 of the orifice 3 fulfils the function of a nut fixed with respect to the flange 2 in which the movable nut 1 is screwed. Preferably, the external thread of the portion 11 of the nut 1 makes at least one turn, like that of the internally tapped portion 8 of the orifice 3 in the flange 2. In this way, the thread fulfils its function of transforming a rotational movement of the nut 1 into a translation along the axis of the orifice 3 while opposing a frictional resistance to this rotation. There is therefore no risk of the nut 1 accidentally disconnecting from the flange 2 during manipulation of said flange.

In a second embodiment, the flange does not for example have sufficient thickness for it to be possible to create two portions of different diameters in the orifice. The configuration according to the invention is described below.

Figure 3:
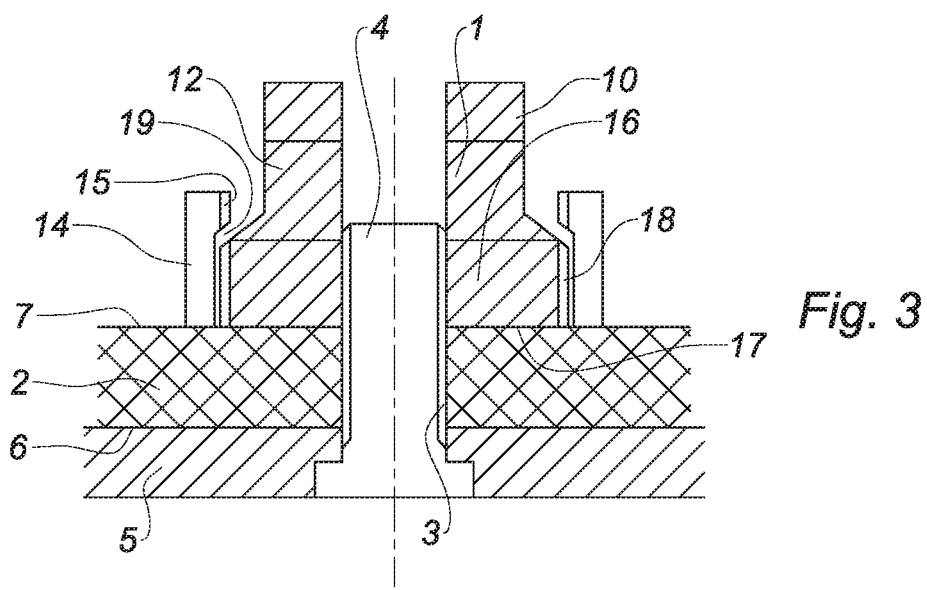
FIG. 3 is a radial section of a second embodiment of the nut and the flange according to the invention, the nut being in the mounted position on the flange and tightened on the stud.

As can be seen in FIG. 3, the orifice in the flange 2 has a simple cylindrical shape and a diameter substantially equal to that of the stud 4 that passes through it. On the other hand, a cylinder 14 having a diameter greater than that of the orifice 3, centred on the axis of the orifice 3, is fixed to the external surface 7 of the flange 2. The top part 15 of said cylinder 14 has an internal tapping making at least one turn. In a variant, the threads corresponding to this internal tapping may amount to a limited number of lugs, typically four, distributed over a circumference.

This internally tapped portion 15 leaves a free height between it and the external surface 7 of the flange, which forms a cavity 19, the diameter of which is at least equal to that of the portion 15, at the hollow of the threads of the internal tapping. This cavity 19 is delimited by the internally tapped portion 15 at one axial end and by the surface 7 of the flange 2 at the other end.

The head 10 of the nut 1, still situated at the top part, is connected by an intermediate cylindrical portion 12 to its other end 16. In this embodiment, it is the transverse surface 17 of the end 16 opposite to the head 10 that fulfils the function of bearing on the flange 2, in order to press it against the surface of the support 5, when the nut 1 is tightened on the stud 4.

The externally threaded portion 18 of the nut 1 is, for its part, positioned on the end 16 supporting the bearing face 17 and is able to be screwed into the internally tapped portion 15 of the cylinder 14 surrounding the orifice. The intermediate portion 12 and the non-threaded part of the end 16 supporting the externally threaded portion 18 have a diameter of less than that of the internally tapped portion 15 of the cylinder 14, at the edge of the threads of its tapping. The top internally tapped part 15 of the cylinder 14 therefore forms a nut, fixed with respect to the flange 2, in which the nut 1 is screwed.

This time, the distance between the top part of the externally threaded portion 18 of the nut 1 and the bearing surface 17 of its base 16 is less than the distance between the bottom part of the internally tapped portion 15 on the cylinder 14 and the surface 7 of the flange 2. Preferably, the externally threaded portion 18 is situated close to the bearing surface 17. In this way, when the nut 1 is in the mounted position, it can be slackened from the stud 4 without there being any interaction between the externally threaded portion 18 of the nut 1 and the internally tapped portion 15 connected to the flange 2. Likewise, when the nut 1 is in the free position on the flange 2, it is held in the cavity 19 formed by the cylinder 14 fixed to the flange 2. In order to separate the nut 1 from the flange 2, it is necessary to unscrew the externally threaded portion 18 from the internally tapped portion 15 of the cylinder 14.

Finally, in order to perform the tightening operations using a flat spanner for example, it is necessary for the intermediate portion 10 to have a sufficient length that makes the head 10 of the nut 1 project out of the cylinder 14. In a variant using other tools, such as a socket spanner for example, it is not necessary to make the head 10 project out of the cylinder 14.

Figures 4, 5:
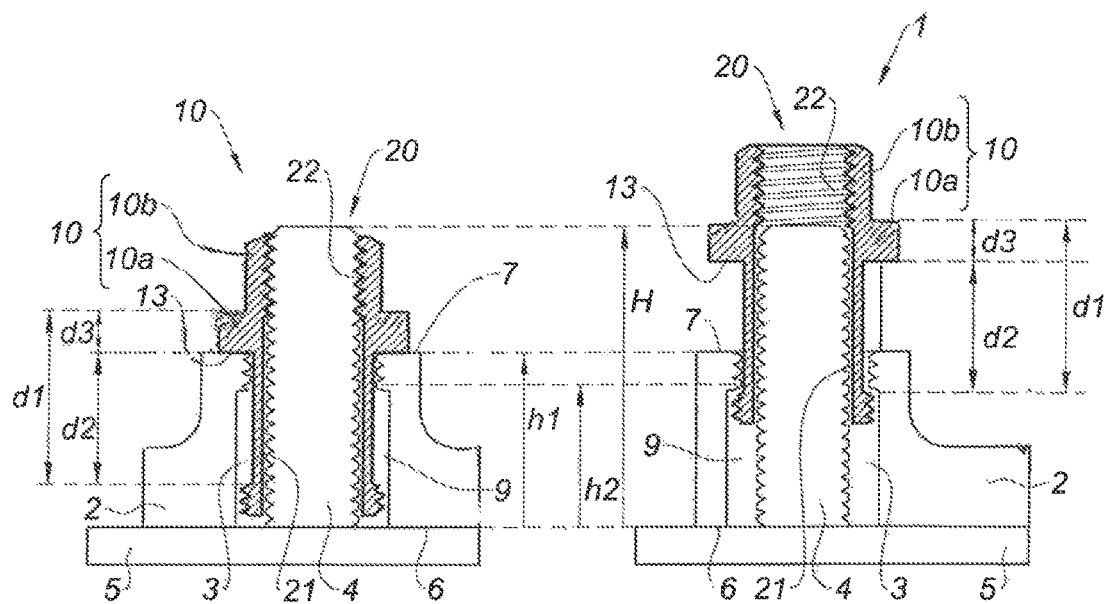
FIG. 4 is a radial section of a variant of the first embodiment of the nut and the flange according to the invention, the nut being in the mounted position on the flange and tightened on the stud.
FIG. 5 is another radial section of the same variant of the first embodiment of the nut and the flange according to the invention, the nut being in the free position on the flange and unscrewed from the stud.

Another aspect of the invention is provided by a variant of the first embodiment, described previously in FIGS. 1 and 2. With reference to FIG. 4, a distance h1 separating the external face 7 of the flange 2 from the internal face 6 is defined over a surface corresponding to the bearing of the transverse face 13 of the head 10 of the nut 1. In this variant, this distance h1 is greater than the mean thickness of the flange 2. This makes it possible in particular to increase the axial length h2 of the cavity 9 of the orifice 3.

Moreover, the nut 1 has two distinctions compared with the configuration previously described.

Firstly, its head 10 comprises a first part 10a that supports the bearing surface 13, extended by a second part 10b towards the outside with respect to the flange 2. This extension of the nut 1 makes it possible to extend the length of the cylindrical cavity 20 of the nut 1 in which the threaded rod of the stud 4 passes.

Figures 6A, 6B:
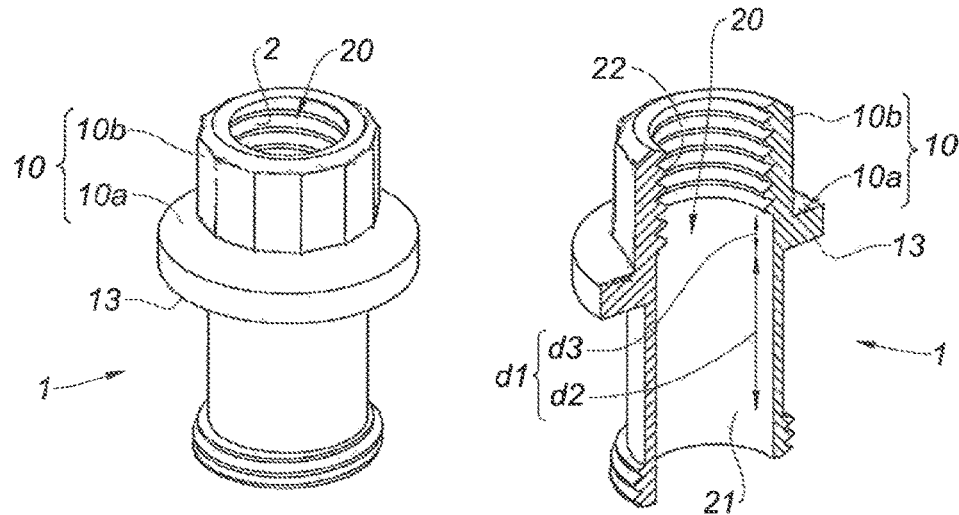
FIGS. 6a and 6b are perspective views of a nut used for the variant corresponding to FIGS. 4 and 5, whole or cut along a meridian plane.

Moreover, in the example shown, the outer surface of the second part 10b does not have the same outside diameter as the first part 10a. This may be used to separate the functions between the two parts 10a, 10b of the head 10, as can be seen in FIG. 6a. The external surface of the first part 10a, bearing on the flange 2 by means of the transverse surface 13, is smooth, while the external surface of the second part 10b is formed so as to cooperate with a tightening tool.

Secondly, as can be seen in FIG. 6b, the cavity 20 of the nut 1 is divided into two portions. A first portion 21, the internal surface of which is smooth, starts at the end of the nut 1 turned towards the internal face 7 of the flange 2. A second portion 22, having an internal thread, starts from the end of the nut turned towards the outside of the flange 2 in order to join the first portion.

The diameter of the cross section of the first portion 21 is slightly greater than that of the threaded rod of the stud 4. This first portion is arranged so that the stud 4 can slide freely inside while being substantially guided along the axis of the nut 1.

The thread on the second portion 22, for its part, is arranged so as to cooperate with the threaded rod of the stud 4 in order to tighten the nut 1 on the stud 4.

This variant makes it possible to reproduce the three situations of the flange 2 and the nut 1 with respect to the support 5 that have already been described: the first situation, in the mounted position, where the nut 1 is screwed onto the stud 4 so as to press the flange 2 against the support 5, the second situation, in the free position, where the nut 1 is held on the flange 2, separated from the support 5, and the third situation, in the separated position before insertion of the nut 1 in the flange 2.

The second and third situations, which are fundamentally similar to those already described, are not returned to here.

The first situation, illustrated in FIG. 4, on the other hand, has a few features particular to this variant.

First of all, it will be noted that the first portion 21 of the cavity 20 of the nut 1 extends so that the second portion 22, the surface of which is threaded, is situated, in the axial direction of the nut 1, at a distance d3 above the transverse bearing surface 13 and therefore also above the external face 7 of the flange 2 around the orifice 3.

As the stud 4 must be able to be screwed into the second portion 22 of the nut 1, this leads to the fact that the length H of the stud above the face of the support 5 is at least equal to the distance h1 between the external 7 and internal 6 faces of the flange 2, plus this distance d3 in the nut 1:

$$H > h1 + d3 \tag{1}$$

It can also be noted that, for the flange 2 to be pressed against the surface of the support 5 when the nut 1 is tightened, it is necessary for the length d2 of the intermediate cylindrical portion 12, defined previously on the external surface of the nut 1 between the bearing surface 13 and the externally threaded portion 11, to be less than the distance h1 between the external 7 and internal 6 faces of the flange 2.

$$d2 < h1 \tag{2}$$

If the axial distance d1 between the portion 11 having a thread on the external surface and the portion 22 of the cavity 20 having an internal thread is considered along the nut 1, this distance is equal to the sum of the distance d3, between the portion 22 and the transverse bearing surface 13, and the distance d2 of the external intermediate portion 12:

$$d1 = d2 + d3 \tag{3}$$

Finally, the height h2 of the cavity 9 of the orifice 3 makes it possible to give to the length d2 of the outer intermediate portion 12 of the nut 1 a value appreciably greater than the length (h1−h2) of the internally threaded portion 8 of the orifice 3 in the flange 2. The externally threaded portion 11 of the nut 1 is therefore separated from the internally threaded portion 8 of the orifice 3, when the device is in the first situation, by an appreciable distance d4=d2−(h1−h2).

This makes it possible to define a fourth situation of the device, illustrated in FIG. 5, where the flange 2 and its nut 1 are placed in a position centred on the stud 4, the nut 1 being totally free to rotate with respect to the stud 4 and the flange 2. In the situation shown, the flange 2 is in addition pressed against the support 5, its internal face 6 being in contact therewith.

This fourth situation has several advantages. Firstly it makes it possible to correctly place the flange 2 on the support 5 before tightening the nut 1. In particular when there are a plurality of studs 4 corresponding to the flange 2, it is thus possible to correctly centre the flange 2 on the studs 4 of the support 5 before tightening the nuts 1.

Secondly, it makes it possible to unscrew the nut 1 from the stud 4 without engaging it in the threaded portion 8 of the orifice 3 in the flange 2. It is therefore possible to completely unscrew the nut 1 from the stud 4 without risking disengaging it from the flange 2 by making it pass through the threaded portion 8 of the orifice 3. The risk of losing the nut 1 is therefore prevented.

With reference to FIG. 6, in this situation, the nut 1 is translated towards the outside of the flange so that the outer threaded portion 11 of the nut 1 is in the cavity 9 of the orifice 3, close to the internally threaded portion 8. The bearing surface 13 of the nut 1 is therefore separated from the external face 7 of the flange 2 by a distance substantially equal to or slightly less than the distance d4 previously defined in the first situation.

So that the nut is also free to rotate with respect to the stud 4, the threaded portion 22 of the cavity of the nut must be above the threaded rod of the stud 4. The height H of the stud 4 above the support 5 must therefore be less than the sum of the height h2 of the cavity 9 of the orifice 3 and the distance d1 separating the externally threaded portion 11 from the internally threaded portion 22 on the nut 1:

$$H<d1+h2 \quad (4)$$

Taking account of relationship (3), on the nut 1 this also links the length d2 of the intermediate portion to the distance d3 separating the internally threaded portion 22 from the transverse bearing surface 13 by the inequality:

$$d2>(H-h2)-d3 \quad (5)$$

Moreover, if the location is determined with respect to the external face 7 of the flange 2, the difference between the height H of the stud 4 and the thickness h1 of the flange must be less than the distance d4 by which the nut 1 has been brought out, plus the distance d3 between the transverse bearing face and the internally threaded portion 22 in the head 10 of the nut 1:

$$d4+d3>H-h1 \quad (6)$$

The features of the flange 2, of the nut 1 and of the stud 4 are therefore linked, in this variant, in order to allow this fourth situation to be implemented.

If the geometry of the nut is considered in particular, it can be seen that the length d2 of the outer intermediate portion 12 must satisfy two opposite inequalities, the number (2) in the first situation and the number (5) in the second situation.

This reveals a useful distinguishing feature of the nut 1 that has been described in this example. The greater the distance d3 by which the inner threaded portion 22 is placed above the transverse bearing surface 13, the easier it is to satisfy the inequality (5) while remaining within the limit imposed by the inequality (2).

Moreover, the height h2 of the cavity 9 of the orifice 3 in the flange 2 also fills a favourable role for implementing this variant. This is because, the greater said height is, the greater the length of movement d4 that it gives for changing from the first situation to the fourth situation.

The invention claimed is:

1. A fixing device for assembling a first part and a second part, the fixing device comprising:
    a nut non-rigidly coupled to the first part,
    a threaded rod coupled to the second part,
    wherein the first part includes a fixing flange comprising
        at least one orifice positioned to accept the threaded rod when the first part and the second part are assembled,
    a retainer on an inner diameter of the at least one orifice positioned to retain the nut within the fixing flange before the nut is screwed onto the threaded rod,
    wherein the retainer includes a threaded portion,
    the nut comprising an externally threaded portion configured to be screwed into the threaded portion of the retainer and wherein the externally threaded portion of the nut passes completely through the threaded portion of the retainer until the nut is received in a cavity for axially retaining the nut, the cavity allowing free rotation of the nut before the nut is screwed onto the threaded rod.

2. The fixing device according to claim 1, wherein the cavity is delimited at one axial end by an axial end of the threaded portion of the retainer and at its opposite end by the second part or a portion of the fixing flange.

3. The fixing device according to claim 1, wherein the orifice comprises a second non-threaded portion, the inside diameter of which is greater than that of the threaded portion of the retainer.

4. The fixing device according to claim 1, wherein the nut comprises a bearing surface which bears on the fixing flange, the bearing surface separated axially from the externally threaded portion of the nut by an intermediate portion of the nut, wherein an outside diameter of the intermediate portion of the nut is less than an outside diameter of the externally threaded portion of the nut.

5. The fixing device according to claim 4, wherein the intermediate portion on the nut has an axial dimension greater than that of the threaded portion of the retainer.

6. The fixing device according to claim 4, wherein the bearing surface of the nut comprises an external annular collar, wherein at least one external peripheral part of the external annular collar has a polygonal shape in cross section to cooperate with a tool when screwing the nut.

7. The fixing device according to claim 4, wherein the bearing surface has an outside diameter greater than that of the outside diameter of intermediate portion of the nut.

8. The fixing device according to claim 4, wherein the nut comprises a first internal hollow portion and a second internally thread portion, wherein the first internal hollow portion is positioned to accept the threaded rod while maintaining a free rotation of the nut about the threaded rod before screwing the threaded rod into the second internally threaded hollow portion of the nut.

9. The fixing device according to claim 8, wherein an axial distance on the nut between the second internally threaded hollow portion and the externally threaded portion is greater than a length of the intermediate portion of the nut.

10. The fixing device according to claim 9, wherein a sum of a height of the cavity in the fixing flange and the axial distance on the nut between the second internally threaded hollow portion and the externally threaded portion is greater than a length of the threaded rod above a surface of the second part.

11. The nut for the fixing device according to claim 8, comprising a first axial end comprising the externally threaded portion, a second axial end opposite the first axial end, the second axial end configured to cooperate with a tool for screwing the nut a thru-hole with a first opening proximate the first axial end and a second opening opposite the first opening proximate the second axial end, the thru-hole comprising an internally threaded portion proximate the second axial end, the cross section of the thru-hole being greater than a cross-section of the internally threaded portion, wherein the externally threaded portion is separated from the internally threaded portion by a distance greater than a distance between the externally threaded portion and the bearing surface.

12. A turbine engine, comprising at least the first part and the second part connected by at least one fixing device according to claim 1.

13. The turbine engine according to claim 12, comprising at least one of an aircraft turbojet engine or turboprop engine, the turbine engine comprising a nacelle and wherein the first part is an item of equipment and the second part is a portion of the nacelle of the turbine engine.

14. A method for fixing a first part and second part in a turbine engine by the fixing device according to claim 1, wherein the method comprises the steps of:
  screwing the externally threaded portion of the nut into the internally tapped portion until the externally threaded portion is engaged and held axially in the cavity,
  positioning the first part on the second part so that the nut is aligned on an axis of the threaded rod, and
  screwing the nut onto the threaded rod by means of a screwing tool, until the nut bears on the fixing flange.

15. The turbine engine according to claim 13, wherein the equipment is a sensor.

16. The fixing device of claim 1, wherein the fixing device comprises one or more nuts.

* * * * *